Aug. 21, 1951  C. CHEDISTER  2,564,656
METHOD OF FORMING INFLATABLE BODIES
FROM THERMOPLASTIC SHEETING
Filed Aug. 17, 1946  2 Sheets-Sheet 1
FIG. 1
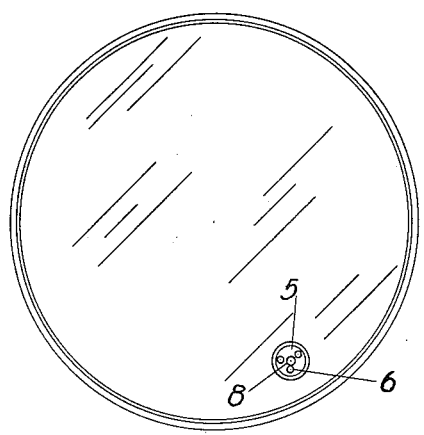
FIG. 3
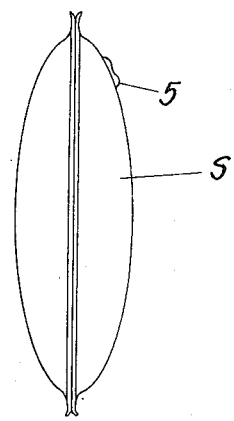
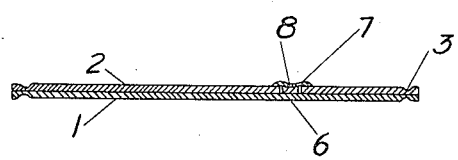
FIG. 2
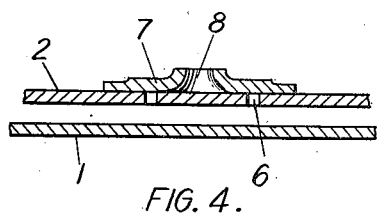
FIG. 4.
INVENTOR.
C. Chedister
BY
Morgan, Finnegan&Dorr Aug. 21, 1951  C. CHEDISTER  2,564,656
METHOD OF FORMING INFLATABLE BODIES
FROM THERMOPLASTIC SHEETING
Filed Aug. 17, 1946  2 Sheets-Sheet 2

INVENTOR.
C. Chedister
BY
Morgan, Finnegan + Durham

Patented Aug. 21, 1951

2,564,656

UNITED STATES PATENT OFFICE 2,564,656

METHOD OF FORMING INFLATABLE BODIES FROM THERMOPLASTIC SHEETING

Conkling Chedister, Livingston, N. J.

Application August 17, 1946, Serial No. 691,370

2 Claims. (Cl. 154—85)

The invention relates to methods and means for producing hollow inflatable bodies from thermoplastic sheeting.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a top plan view of two discs of thermoplastic sheeting sealed together for the formation of a ball in accordance with the invention;

Fig. 2 is a central vertical section of the device shown in Fig. 1;

Fig. 3 shows in side elevation said device partially inflated to form an oblate spheroid;

Fig. 4 is an enlarged fragmentary sectional detail showing the valve construction as in Fig. 2;

Figure 5:
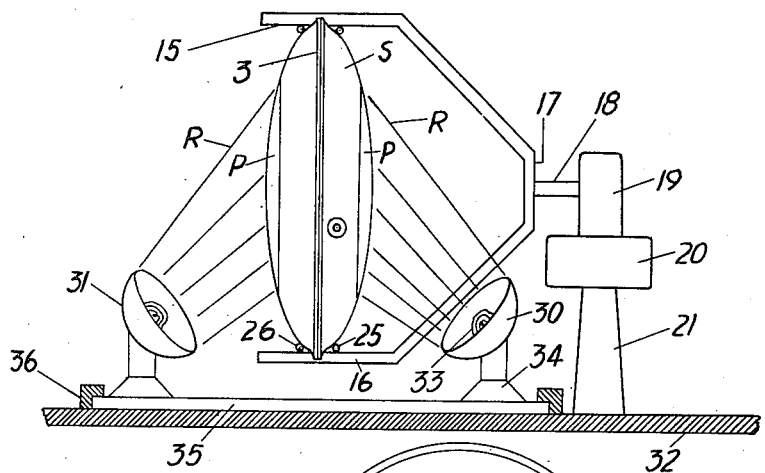
Fig. 5 is an end elevation, with parts in section, showing apparatus embodying the invention, in the operation of forming or shaping said ball.

Objects of the invention are to produce efficiently, cheaply, rapidly and uniformly, hollow inflatable spheres or bodies of other predetermined configurations from flat sheets of thermoplastic sheeting such as a suitably plasticized vinyl acetate-vinyl chloride copolymer. The balls or inflated sperical bodies so produced may be used for playthings, balloons, in solar stills and in any other fields where such inflated elastic bodies may be needed. The invention is directed to making such balls, when inflated, to shapes as near as possible to the spherical or other desired shape and to so condition them that they will resume the shaping imparted to them after deflation and re-inflation. The invention also fully preserves the elastic qualities of the sheeting used and detracts to the minimum degree from the strength of the material in the thinnest areas of the hollow body.

The operations comprising the invention are carried out with exceedingly simple equipment and are performed by relatively unskilled labor. A minimum amount of handling is required and the awkward, inefficient and dangerous methods heretofore employed in attempting to make such objects by the use of steam, hot water or other fluids are wholly overcome. Heretofore such hollow inflatable bodies have been made by shaping single pieces of sheeting into hemispheres and thereafter joining the hemispherical parts, whereas my invention is applied to a multi-ply body of flat sheeting already joined, which is formed in a single shaping operation to the desired final shape. The invention further accomplishes the formation of a complete, integral, sealed, two-piece ball in a minimum number of steps and said ball is completely fabricated when the final shaping operation of the process has been performed without requiring additional sealing or assembling operations.

Another object of the invention is to provide a method and apparatus for fabricating such inflatable bodies by the application of radiant heat to thermoplastic materials and the utilization of the stretching and inflationary action of heated air or other gas to effect automatically the shaping action under the influence of such radiant heat.

Briefly described, the method of the invention comprises sealing together at their perimeters two flat circular discs of thermoplastic sheeting or the like, one of said discs having a valve formed in it. The flat two-ply body so formed is then partially inflated to form a relatively flat oblate spheroid. Heat, preferably of infrared or other radiant character, is directed against the polar regions of the spheroid to soften the thermoplastic sheeting thereat. As soon as said material has been sufficiently plasticized, so that it will stretch or flow slowly under pressure, the spheroid is further inflated with air or other gas and automatically the internal fluid pressure causes the plasticized polar regions to assume virtually spherical contours. While said regions are being heated, the spheroid is preferably rotated on its axis to distribute the heat uniformly. Heat is next applied to the zone of the inflated spheroid lying more nearly the equatorial region thereof so as to cause a further stretching and spherical shaping of the ball in such intermediate and equatorial zones. By such combined heating and fluid inflating actions, the hollow body can be caused rapidly to acquire a virtually perfect spherical shape. When said shape is reached the ball is allowed to cool while inflated so that the thermoplastic material will set in the shape acquired. It may then be deflated and packaged for shipment and upon reinflation will reassume the shape it acquired under the processing.

It will be understood that the foregoing general description and the following detailed description as well are exemplary and explanatory but are not restrictive of the invention.

Referring now in detail to the present preferred embodiment of the invention, illustrated by way of example in the accompanying drawings, a spherical ball made in accordance with the invention is formed from two flat discs 1 and 2 of a suitably plasticized vinyl acetate-vinyl chloride copolymer (preferably vinyl acetate chloride copolymer 65 to 85% chloride with di-octyl phthalate as a plasticizer and formed as a flexible film). The sheeting from which said discs are made can be of any appropriate thickness, preferably between .008" to .020", although these dimensions are not to be considered as limiting. Said discs are first hermetically sealed together by an annular seal 3 just inside their perimeters, said seal being preferably, but not necessarily, effected by placing the two discs between annular electrodes of a high frequency circuit wherein the fusing temperature of the copolymer is reached in a very short period of time because of the dielectric resistance of the material to the passage of high frequency waves. I have found that this method of sealing is exceeding rapid and completely certain in operation. However, other known methods of heat-sealing, or sealing by adhesive material or solvents may be used. Prior to said sealing operation a valve 5 is preferably formed in the sheet 2 of the two-ply body. Said valve may be of any suitable construction designed to admit air under pressure but prevent its escape from the interior of the body except when desired. In practice I have found that a relatively simple flap valve construction is conveniently employed, said construction comprising the provision of a plurality of holes 6 formed through the sheet 2 and spaced uniformly about a center (Fig. 4). An annular disc 7 of relatively rigid suitably plasticized vinyl acetate-vinyl chloride copolymer or other thermoplastic material is centrally disposed so as to cover the three holes 6 and have its central opening 8 centrally disposed with respect to said holes. When so positioned, the disc 7 is hermetically sealed about its perimeter, electronically or otherwise, to the outer surface of sheet 2. It will be understood that this construction permits the introduction of gas under pressure into the space between the plies 1 and 2 by blowing against the exposed portion of sheet 2 through the opening 8 of the disc. The air then depresses the sheet 2 inside the sealed disc 7 and enters through the holes 6 into the space between the discs. The internal pressure of the air tends to hold flexible sheet 2 against the inner surface of rigid disc 7 and thus normally prevent escape of air through the openings 6.

As shown in Fig. 3 the next step in the operation is to inflate the two-ply body to a relatively flat oblate spheroid S.

In accordance with the invention, apparatus is next provided for radiantly heating the polar regions of said oblate spheriod S so as to render same sufficiently plastic to attain the desired spherical contours. For this purpose means are provided for supporting the spheroid S so as to hold and rotate same in the field of radiant heat imparted thereagainst. For this purpose a generally U-shaped bracket having horizontal arms 15 and 16 is connected at its end portion 17 to a rotary shaft 18, said shaft being driven through gearing 19 and motor 20, diagrammatically shown, and mounted on a supporting pedestal 21. This apparatus is constructed to hold the spheroid S in position to rotate same about its horizontal polar axis, said rotation being performed while radiant heat energy is directed against various zones of the spheroid as later described in detail. For the purpose of holding the spheriod in the desired position, a pair of spaced holding rings or hoops 25 and 26 are held between the bracket arms 15 and 16, said rings being axially disposed with respect to the axis of rotation of the bracket and shaft 18. When the spheriod S is inflated to its initial oblate shape as shown in Figs. 3 and 5, it can be forced into the space between the rings 25 and 26 so that its equatorial portion adjacent the sealed edges 3 lies between the hoops and bears resiliently against the inner surfaces of the bracket arms 15 and 16. This arrangement grips the inflated spheroid sufficiently tightly to hold it securely during the rotation thereof and the ensuing shaping operations.

In accordance with the invention means are provided for directing radiant heat energy, preferably in the form of infra-red radiation, against the surface of the spheroid to be shaped. For this purpose the invention preferably provides a pair of radiant heat radiators 30 and 31 which are mounted on the general base or platform 32 of the apparatus and adapted to be variously positioned with respect thereto and with respect to the surfaces of the spheroid S so as thereby to regulate the direction and intensity of the heat radiation against the surfaces of said spheroid. The heat radiators 30 and 31 are identical in construction and, as shown, comprise conventional radiant heater constructions having exposed incandescent electrical resistance coils 33 encased within parabolic or other concave reflectors as shown. The pair of heaters 30 and 31 are fixed by their pedestals 34 to a base plate 35 which in turn is slidably movable along the upper surface of the platform 32, the edges of said plate 35 being slidably guided and restrained by grooved brackets 36 fixed to the platform 32.

Figure 6:
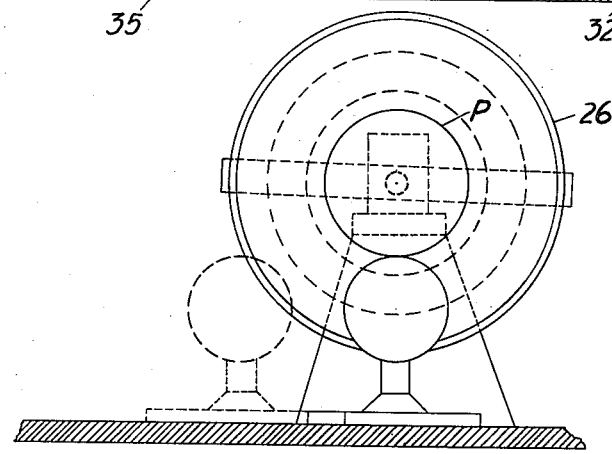
Fig. 6 is a transverse central vertical section of the apparatus shown in Fig. 5.

By means of this construction the plate 35 and the pair of heaters 30 and 31 may be variously positioned with respect to the axis of rotation of the spheroid, for example, as indicated by the two positions shown in full and dotted lines, respectively, in Fig. 6. It will also be understood that the inclinations of the reflectors of the radiant heaters 30 and 31 may also be varied by any suitable or conventional means so that the angle of direction of the radiant heat rays R will be varied within desired limits. It will be obvious that the spacing between the pair of heaters 30 and 31 is such that they do not interfere with the rotary movement of the spheroid-holding bracket 15—17.

In the operation of the above-described apparatus the initially inflated oblate spheroid S is positioned in the bracket as shown in Fig. 5 and the heaters 30 and 31 positioned with respect to it so that their rays are directed against the polar regions or zones P of the spheroid, the focus of said rays being slightly off center with respect to the actual poles of the spheroid. Simultaneously the spheroid is rotated by means of the apparatus shown so that the heat radiated from the lamps is distributed uniformly within the polar zones P. The position of the lamps or heaters for this initial heating operation is that indicated in Fig. 5 and in full lines in Fig. 6. The speed of rotation of the spheroid during this heating operation is so regulated with respect to the proximity of the heaters and the intensity of the heating rays, and as determined by the radiant-heat absorptivity of the thermoplastic sheet itself (which depends somewhat on its color, the plasticizer used therein and other factors) that the entire polar region P at either pole of the spheroid is brought to the desired degree of thermoplasticity and softness and stretchability in one complete revolution of the spheroid. In the apparatus here shown using the type of vinyl acetate-vinyl chloride copolymer disclosed in a spheroid having an initial disc diameter of 21" (Fig. 2) and with the type of radiant heaters disclosed, I have found that a speed of rotation of about 4 R. P. M. is desirable, but this will vary of course with variations in the factors mentioned above.

When the desired state of plasticity has been reached in the zones P, then additional air or other fluid under pressure is introduced into the spheroid through the valve 5. This is preferably done by attaching to said valve a conduit carrying air under pressure and the inflating action may be performed while the spheroid continues to rotate at the slow speed of 4 R. P. M. During or immediately after said inflation, the heaters 30 and 31 are moved so that their radiant heating action is no longer directed against the zones P.

Figure 7:
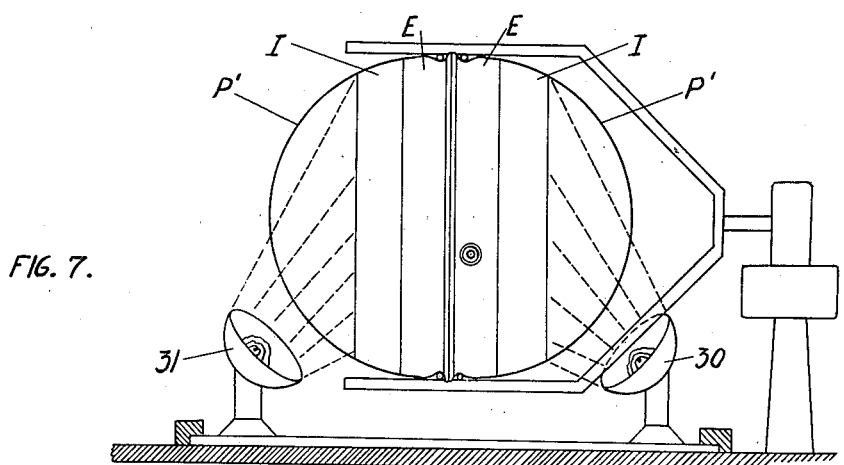
Fig. 7 is a view similar to Fig. 5, showing a later stage of said operation.

As shown in Fig. 7, the inflation of the polar zones while in the plasticized state automatically causes them to stretch and assume substantially spherical contours P'. The zones E of the pole or spheroid in such state are essentially spherical in contour because of their proximity to the equator of the ball. However, after the zones P have been inflated to spherical contour as indicated by P' in Fig. 7, there remain intermediate zones I the unmodified shapes of which keep the ball from being a true or substantial sphere. It is therefore necessary to impart a certain amount of plasticizing heat to said zones I so that they can stretch and shape themselves into conformity with the remaining spherical contours of the ball.

For that purpose the radiant heaters 30 and 31 are moved farther away from the axis of rotation of the ball (that is to the position shown in dotted lines in Fig. 6 and in Fig. 7) so that their rays will impinge against the zones I of the ball and will suitably soften the thermoplastic material therein during one rotation of the ball at the speed previously described. It will be understood that the greatest amount of stretch must be imparted to the plastic material in the polar regions and that said stretching or thinning of the thermoplastic sheeting will diminish progressively as it nears the equatorial region of the ball. This effect is accomplished automatically with the invention by the imposition and direction of the radiant heat rays R from the heaters 30 and 31. In Fig. 7, for example, it will be apparent that the rays striking the borders of the zones I will be of greater intensity and impart a greater amount of heat than the rays striking the portions of said zones nearer the equatorial zones E because of the proximity and angles of impingement from the rays of the two heaters. The same variation in heat intensity will be accomplished with respect to the polar regions when the heaters are in the position shown in Fig. 5.

As the thermoplastic sheeting softens as described and as shown in Fig. 7, said material will be caused to stretch into the desired spherical shape by the increase in internal pressure of the air or gas within the ball. Said increased fluid pressure automatically is provided by the heating and consequent expansion of said confined air within the ball, although if necessary or desired, a further amount of air under pressure may be introduced into the ball at this stage in the manner previously disclosed.

The ball having assumed virtually spherical shape by reason of the operations described above, it is then promptly removed from the bracket and from the influence of the heaters, but is allowed to remain in its inflated condition for a time sufficient to permit the thermoplastic material to cool to a non-plastic or hardened state. In practice I have found that the particular vinyl acetate-vinyl chloride copolymer material described above reaches a state of thermoplasticity sufficient for the stretching and shaping actions required at temperatures somewhere between 150° F. and 200° F., depending upon the plasticizer, the dye, the thickness and other composition factors thereof. In the preferred embodiment of the invention and using the vinyl acetate-vinyl chloride copolymer herein specifically described, the thermoplastic material comprising the spheroid or ball is brought to temperatures between 165° F. and 175° F. during the heating operations. When the inflated and shaped ball reaches temperatures in the neihgborhood of room temperature, it is therefore in condition for deflation, the thermoplastic material thereof having hardened and acquired a permanent set in the stretched and shaped condition by cooling while inflated. Before deflating, but after cooling, the ball may be further inflated for testing as to effectiveness of the thermoplastic seal, etc. It is then deflated and packaged for shipment. It will be understood that with subsequent inflations of the ball, it will always attain the spherical shape imparted to it by the shaping operations hereinabove described.

The invention in its broader aspects is not limited to the specific mechanisms shown and described but departures may be made therefrom within the scope of the accompanying claims without departing from the principles of the invention and without sacrificing its chief advantages.

What is claimed is:

1. A method for forming an inflatable, substantially spherical ball from thin thermoplastic sheets which comprises joining said sheets and inflating them with air under pressure to form a relatively flat oblate spheroid, heating said spheroid in its polar regions to expand the air therein and cause said heated regions to stretch under the increased air pressure, further inflating the interior space of the spheroid to cause the spheroid to assume substantially spherical shape and maintaining the spheroid free from external restraint in the heated areas during the heating and inflating thereof.

2. The method of forming an inflatable, substantially spherical ball from thermoplastic sheeting which comprises securing at its equatorial zone an inflated oblate spheroid formed by two peripherally sealed discs of thermoplastic sheeting, directing radiant heat against areas of the spheroid remote from said equatorial zone, rotating the spheroid on its minor axis while subjecting said areas to said heat to plasticize same and further inflating the ball while so plasticized to cause said areas to stretch into substantially spherical shape, leaving said heated zones free to expand under internal fluid pressure and continuing to restrain expansion at said equatorial zone.

CONKLING CHEDISTER.

REFERENCES CITED

The following references are of record in the file of this patent:

UNITED STATES PATENTS

| Number | Name | Date |
|---|---|---|
| 1,139,341 | Gigol | May 11, 1915 |
| 2,094,511 | Welch | Sept. 28, 1937 |
| 2,315,124 | Luzius | Mar. 30, 1943 |
| 2,323,629 | Spanel | July 6, 1943 |
| 2,377,946 | Leary | June 12, 1945 |

OTHER REFERENCES

Modern Plastics, Oct. 1943, pp. 96–97, "The Blowing of Plastics."